(12) United States Patent
Fuchs et al.

(10) Patent No.: US 11,257,601 B2
(45) Date of Patent: Feb. 22, 2022

(54) NUCLEAR FACILITY WITH A FUEL POOL AND AN ASSOCIATED COOLING MODULE

(71) Applicant: FRAMATOME GMBH, Erlangen (DE)

(72) Inventors: Thomas Fuchs, Wesseling (DE); Kerstin Gauter, Bad Vilbel (DE)

(73) Assignee: Framatome GmbH, Erlangen (DE)

( * ) Notice: Subject to any disclaimer, the term of this patent is extended or adjusted under 35 U.S.C. 154(b) by 21 days.

(21) Appl. No.: 16/571,262

(22) Filed: Sep. 16, 2019

(65) Prior Publication Data

US 2020/0013518 A1    Jan. 9, 2020

Related U.S. Application Data

(63) Continuation of application No. PCT/EP2017/056441, filed on Mar. 17, 2017.

(51) Int. Cl.
*G21C 19/07* (2006.01)
*G21C 19/40* (2006.01)
*F28D 1/02* (2006.01)
*F28D 20/00* (2006.01)

(52) U.S. Cl.
CPC ............ *G21C 19/40* (2013.01); *G21C 19/07* (2013.01); *F28D 1/02* (2013.01); *F28D 2020/0095* (2013.01)

(58) Field of Classification Search
CPC ...... G21C 19/07; G21C 19/32; G05D 1/0692; E02F 9/06; E02F 9/8833; B66D 1/52
See application file for complete search history.

(56) References Cited

U.S. PATENT DOCUMENTS

| | | | | |
|---|---|---|---|---|
| 3,971,482 A * | 7/1976 | Andrea | ................... | G21C 19/20 376/268 |
| 9,779,842 B2 * | 10/2017 | Strohmayer | .............. | G21F 9/28 |
| 9,786,396 B2 * | 10/2017 | Filippone | ............... | G21C 19/07 |
| 9,847,148 B2 | 12/2017 | Lloyd et al. | | |
| 10,844,562 B2 * | 11/2020 | Cole | ........................ | H01F 27/12 |
| 2011/0168159 A1 * | 7/2011 | Lataperez | ............... | F24D 11/00 126/400 |
| 2012/0294737 A1 * | 11/2012 | Singh | ...................... | F01K 25/08 417/410.1 |
| 2013/0108004 A1 * | 5/2013 | Lee | ......................... | G21C 15/24 376/299 |

(Continued)

FOREIGN PATENT DOCUMENTS

| | | | | |
|---|---|---|---|---|
| CN | 105006258 A | 10/2015 | | |
| DE | 2944962 A1 * | 5/1981 | ............. | G21C 19/07 |

(Continued)

*Primary Examiner* — Lily C Garner
(74) *Attorney, Agent, or Firm* — Laurence A. Greenberg; Werner H. Stemer; Ralph E. Locher

(57) ABSTRACT

A nuclear facility has a fuel pool containing a liquid and an associated cooling circuit for a circulating cooling agent. The cooling circuit contains a cooling module with a first heat exchanger which immerges into the liquid, a second heat exchanger which is located outside the fuel pool, and connecting lines between the first exchanger and the second heat exchanger. In order to provide for reliable cooling even if a filling level drops, the cooling module contains a lifting body and floats in the liquid such that its altitude varies with the filling level of the liquid in the fuel pool.

14 Claims, 7 Drawing Sheets

(56) References Cited

U.S. PATENT DOCUMENTS

2015/0146838 A1* 5/2015 Fribourg ................ G21C 15/24
376/298
2019/0325668 A1* 10/2019 Cole ........................ G01N 1/22

FOREIGN PATENT DOCUMENTS

| | | | | | |
|---|---|---|---|---|---|
| DE | 2944962 | A1 | | 5/1981 | |
| DE | 102016212777 | A1 | * | 1/2018 | ............ F28D 1/024 |
| EP | 2715734 | A2 | * | 4/2014 | ............ G21C 19/07 |
| EP | 2715734 | A2 | | 4/2014 | |
| JP | S54161018 | U | | 11/1979 | |
| JP | S5536301 | U | | 3/1980 | |
| JP | S5766800 | U | | 4/1982 | |
| JP | S6057294 | A | | 4/1985 | |
| JP | h0782796 | a | * | 3/1995 | |
| JP | 2013133989 | A | | 7/2013 | |
| JP | 2014512002 | A | | 5/2014 | |
| JP | 2016099354 | A | | 5/2016 | |
| KR | 20150045491 | A | * | 4/2015 | ........... G21C 11/088 |

\* cited by examiner

NUCLEAR FACILITY WITH A FUEL POOL AND AN ASSOCIATED COOLING MODULE

CROSS-REFERENCE TO RELATED APPLICATION

This application is a continuation, under 35 U.S.C. § 120, of copending international application No. PCT/EP2017/056441, filed Mar. 17, 2017, which designated the United States; the prior application is herewith incorporated by reference in its entirety.

BACKGROUND OF THE INVENTION

Field of the Invention

The invention relates to a nuclear facility with a nuclear fuel pool and an associated cooling module.

Spent fuel pool cooling and wet storage pool cooling are essential to nuclear safety. Additional attention to these aspects results from analyses conducted after the Fukushima accident. These cooling systems are required to function reliably during normal operation and during and after various design basis or even design exceeding events. Throughout this description the term 'fuel pool' is to be understood in a broad sense, covering spent fuel pools, intermediate storage pools, and other kinds of pools configured to normally contain nuclear fuel elements or nuclear fuel rods. The invention can even be employed in other nuclear pools or reservoirs which are not configured to hold nuclear fuel elements but must be cooled anyway.

Regarding the pools, special interest must be given to large seismic loads since these pools are often located relatively high in the building. Attention must also be given to reduced water levels due to evaporation and/or leakage of liner, pipes or dam break at accident conditions. Conventional pool cooling systems usually have large support constructions in order to withstand the large seismic loads. Especially for installations in existing plants the required space is not available. In addition, fixed cooling elements, such as known from published, non-prosecuted German patent application DE 10 2010 035 955 A1, will react to reduced water levels with reduced heat transfer power since the water column above the cooling elements is essential to the transferred amount. As a result, higher water temperatures lead to enhanced evaporation and thus faster sinking levels. In the extreme, the fuel rods could be (partially) in contact with air—a situation which has to be avoided by all means in order to prevent a nuclear meltdown in the pool.

SUMMARY OF THE INVENTION

It is an objective of the present invention to provide a solution for the problem of fuel pool cooling which is easy to build, mount, and maintain and which works reliably even if the filling level drops below the design specification.

According to the invention, this objective is met by a nuclear facility according to the independent claim.

A crucial aspect is therefore that the cooling module contains a lifting body and floats in the liquid such that its altitude varies passively with the filling level of the liquid in the fuel pool.

When the liquid level in the pool drops, the floating heat exchanger module automatically adapts its altitude so that the heat exchanger's heat transfer surface remains covered with liquid. Preferably, the height of the water column above the heat exchanger remains the same, even with reduced liquid levels in the pool. This guarantees the removal of a well-defined rate of heat also for accident conditions.

There is no need for a complex, bulky, and expensive support construction which is difficult-to-qualify with respect to seismic loads as is the case for existing solutions. However, it is advantageous to have a lightweight support construction which prevents lateral displacement of the cooling module. This prevents the heat exchanger from leaving the pool when the liquid level rises above the pool's edge and also prevents the heat exchanger from colliding with the fuel elements inside the pool when the liquid level drops. This also prevents the heat exchanger from colliding with a fuel loading machine under normal operation. The proposed support construction is smaller and less complex than its conventional counterpart for a non-floating heat exchanger for the same seismic loads. This solution can easily be retro-fitted to existing facilities but can of course also be used in new constructions. The impact on the fuel pool and its lining is minimal or can even be avoided completely. In a particularly preferable embodiment the pool's liner may remain untouched if, for example, the support construction is hinged from the pool's edge or from above.

Other features which are considered as characteristic for the invention are set forth in the appended claims.

Although the invention is illustrated and described herein as embodied in a nuclear facility with a fuel pool and an associated cooling module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
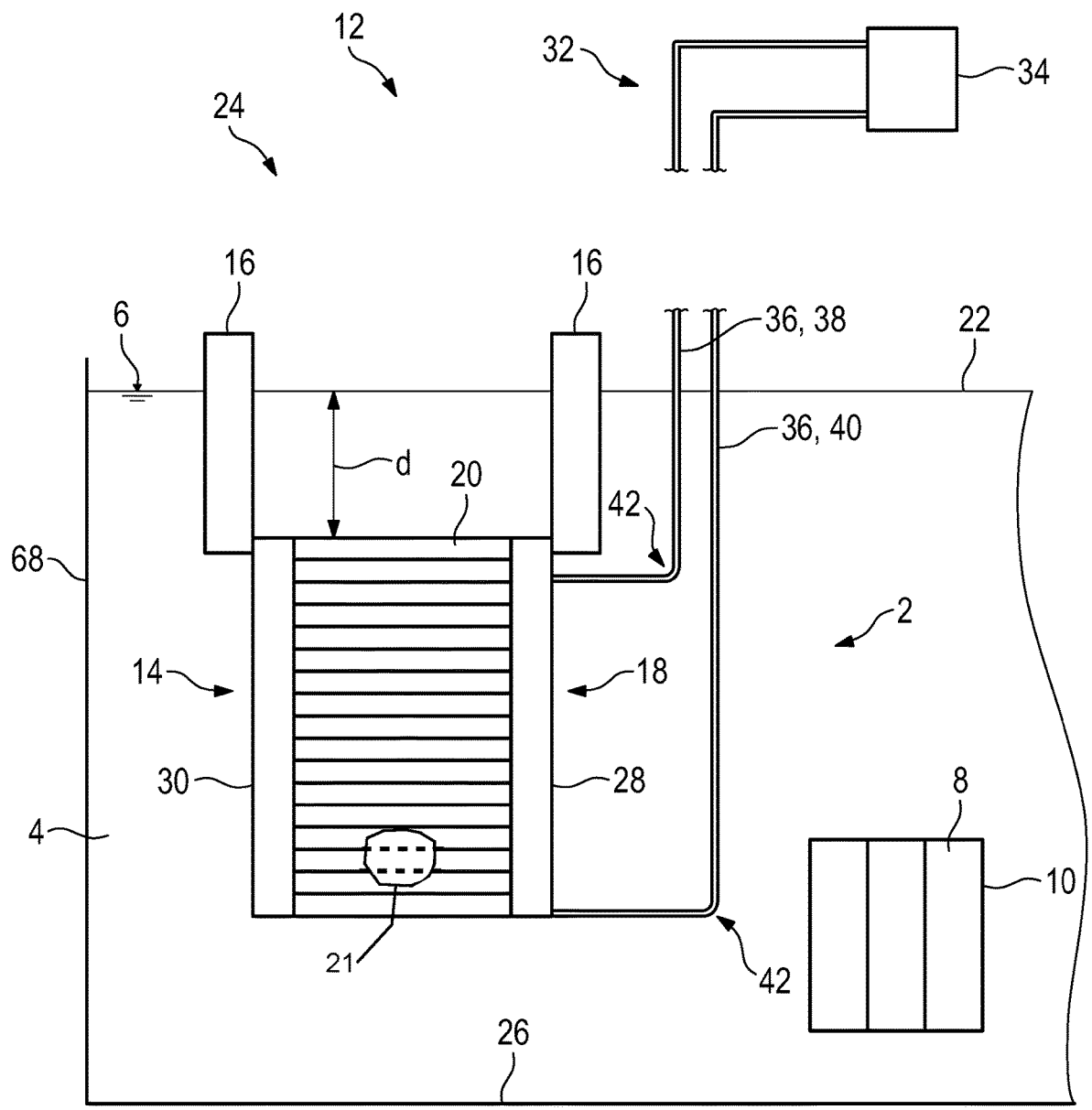
FIG. 1 is a schematic overview of a cooling system for a nuclear fuel pool in a plan view from a lateral position within the pool, the cooling system containing a floating heat exchanger according to the invention.

Likewise technical elements are designated the same reference numerals throughout the drawings.

Referring now to the figures of the drawings in detail and first, particularly to FIG. 1 thereof, there is shown a simplified and purely schematic manner of a first embodiment of the present invention.

A nuclear fuel pool 2 is filled with a liquid 4, preferably basically water, up to a filling level 6. The liquid 4 acts as a primary cooling fluid for a number of nuclear fuel elements 8 placed inside the nuclear fuel pool 2, typically by virtue of a fuel rack 10. The nuclear fuel pool 2 may be a spent fuel pool or a wet storage pool or any other kind of nuclear fuel pool in a nuclear reactor or an intermediate storage facility or any other nuclear facility 12. During operation the filling level 6 may change to a certain extent. However, the filling level 6 must not drop below a given minimum value in order to keep the fuel elements 8 fully submerged into the liquid 4. To this end a number of cooling modules 14 may be arranged within the fuel pool 2, removing heat and keeping the temperature of the liquid 4 well below the boiling temperature, such that massive evaporation is avoided. Of course, there may also be replenishing means for the liquid 4 in the fuel pool 2.

According to the invention there is at least one floating cooling module 14 or floating cooling element, an exemplary embodiment of which is shown in FIG. 1. The cooling module 14 has at least one lifting body 16, for example configured as a hollow body enclosing a volume of air or nitrogen. Alternatively, other materials with a density lower than the density of the liquid 4 in the fuel pool 2 may provide, at least partly, the necessary buoyant forces. Suitable materials are, for example, foams, in particular metal foams. Furthermore, the cooling module 14 contains a heat exchanger 18, preferably with a number of heat exchanger tubes 20 or pipes to be flown through by a cooling fluid or cooling agent. For a better distinction from the primary cooling fluid in the fuel pool, the cooling fluid flowing through the heat exchanger tubes 20 is called secondary cooling fluid. The heat exchanger 18 is fixed to the lifting body 16, either directly or via connecting elements. The connection between the lifting body 16 and the heat exchanger 18 is preferably rigid but may alternatively be flexible and in the latter case may comprise chains or ropes or the like.

The lifting body 16 is configured to create enough buoyancy to lift the cooling module 14 towards the surface 22 of the liquid 4, such that the lifting body 16 floats or swims at the surface 22. Typically, the lifting body 16 protrudes to some extent from the liquid 4 into the air 24 above, as shown in FIG. 1. However, the heat exchanger 18 is arranged below the lifting body 16 such that in the floating state it is completely submerged into the liquid 4. More specifically, the heat exchanger 18 is arranged such that in the floating state there is a distance d between its upper end and the surface 22 of the liquid 4 above. Since the cooling module 14 is freely movable in the vertical direction, at least for some given range of altitude above the ground 26 of the fuel pool 2, it follows any change in the filling level 6 of the liquid 4 within the fuel pool 2. This means that the lifting body 16 floats up and down with the varying filling level 6 such that the distance d between the upper end of the heat exchanger's 18 heat transfer area and the surface 22 of the liquid 4 remains constant over time when the filling level 6 changes. This distance is preferably set, due to suitable geometry and buoyant forces, within the range of a few millimeters up to a few meters.

Nevertheless, it is also possible that a part of the heat transfer area protrudes above the surface 22 of the liquid 4. In other words, in such a configuration the heat exchanger's 18 heat transfer area only partly immerses into the liquid 4. The vertical height of the part above the surface 22 is preferably small in comparison to the height of the part below the surface 22.

The constant distance between the heat exchanger 18 and the surface 22 of the liquid 4 in the fuel pool 2 ensures that the prevailing thermo-hydraulics in the fuel pool 2 can be employed in a very efficient manner for the purpose of heat removal at different filling levels. This concept can also be regarded as passive altitude control with respect to the heat exchanger 18.

Under the assumption, that the secondary cooling liquid flowing through the heat exchanger tubes 20 has roughly the same density as the primary cooling fluid within the fuel pool 2 (e.g. both are essentially water) and that the cooling module 14 weighs, for example, 500 kg, the lifting body has to enclose a volume of roughly 0.5 m$^3$ of air or nitrogen in order to provide the necessary buoyancy. Hence, the space requirement is relatively low.

As mentioned before, the heat exchanger 18 may be a tubular heat exchanger with a plurality of heat exchanger tubes 20, preferably in a (streamwise) parallel configuration between a distributor tube 28 and a collector tube 30. As indicated in FIG. 1 the heat exchanger tubes 20 may be aligned horizontally between a vertical distributor tube 28 and a vertical collector tube 30. However, other configurations and geometries are possible as well. In particular, it may be advantageous if the heat exchanger tubes 20 are essentially aligned vertically. For example, the respective heat exchanger tube 20 may have a U-shape. In general, the heat exchanger tubes 20 may be aligned such that the flow direction of the circulating cooling agent therein is parallel, anti-parallel or perpendicular or slanted with respect to the convection flow of the liquid 4 within the fuel pool 2 (co-current, counter-current, or cross-current configuration). There may be gaps between individual heat exchanger tubes 20 such that the liquid in the fuel pool 2 can flow around them with a maximum contact surface. In order to achieve high heat transfer rates, the heat exchanger tubes 20 may comprise a number of fins of ribs.

The bundle of heat exchanger tubes 20 may be partially enclosed by a protective shell 21, for example a cylindrical or cubical casing/pipe with open end faces, wherein there is preferably a gap between the shell and the heat exchanger tubes 20, facilitating inflow and outflow of liquid 4 from and into the fuel pool 2. The gap creates a suction effect, supporting natural convection of the liquid 4 within the fuel pool 2. Hence, the shell does not only provide protection, but also driving force in the cooling system due to buoyancy force and channel effects (reverse chimney effect). In the cross-current configuration mentioned above or in other configurations the protective shell 21 may have suitable openings facilitating in-/outflow of liquid 4 from a lateral direction.

Typical dimensions of the heat exchanger 18 are as follows: length in the vertical direction for example >4 m, lateral width for example roughly 0.5 m or less. For thermo-hydraulic reasons the cooling module 14 is preferably not placed directly above a fuel element 8, but rather laterally displaced. Hence, a flat design helps to fit into according gaps between the fuel rack 10 and the side wall of the fuel pool 2.

In order to support a stable floating state with minimized risk of tilting, the cooling module 14 preferably has an elongate shape aligned along the vertical direction, and the lifting body 16 may have an annular or ringlike shape as shown in FIG. 1.

The heat exchanger 18 preferably forms part of a cooling circuit 32 in which a secondary cooling fluid or cooling agent circulates. The heat exchanger 18 is thermally coupled to the fuel pool 2 which acts as a heat source for the secondary cooling fluid. A second heat exchanger 34 located outside the fuel pool 2 is thermally coupled to a heat sink, for example ambient air or water. Hence, heat is transferred from the heat source to the heat sink via the circulating secondary cooling fluid. The circulation may be actively forced by a pump switched into the cooling circuit 32. Preferably, however, the cooling circuit 32 is a passive natural convection cooling circuit, driven solely by the prevailing temperature difference between heat source and heat sink. In this case the cooling circuit 32 can either be a one-phase circuit or a two-phase circuit. In a one-phase circuit, also known as a thermosiphon circuit, the secondary cooling fluid does not experience a phase change during circulation. In a two-phase circuit the heat exchanger 18 coupled to the heat source acts as an evaporator for the secondary cooling fluid, and the heat exchanger 34 coupled to the heat sink acts as a condenser. Alternatively, the cooling circuit 32 may be a supercritical circuit, in which the secondary cooling fluid circulates in a supercritical state.

In the present context a one-phase cooling circuit may be advantageous, despite the fact that the achievable heat transfer rate is usually lower than for a two-phase cooling circuit. This is because water at atmospheric pressure or above is particularly suitable as circulating cooling fluid for a one-phase circuit, which makes the overall design very simple.

The heat exchanger 18 is switched into the cooling circuit 32 via connecting lines 36. For example, a feed line 38 for the secondary cooling fluid in FIG. 1 is connected to the distributor tube 28 of the heat exchanger 18, and the discharge line 40 is connected to the collector tube 30 of the heat exchanger 18. In order to accommodate or adapt to the varying filling level 6 within the fuel pool 2 and hence the varying altitude of the cooling module 14 above the ground 26 of the fuel pool 2, the connecting lines 36 comprise a flexible line section 42 each.

Figure 7:
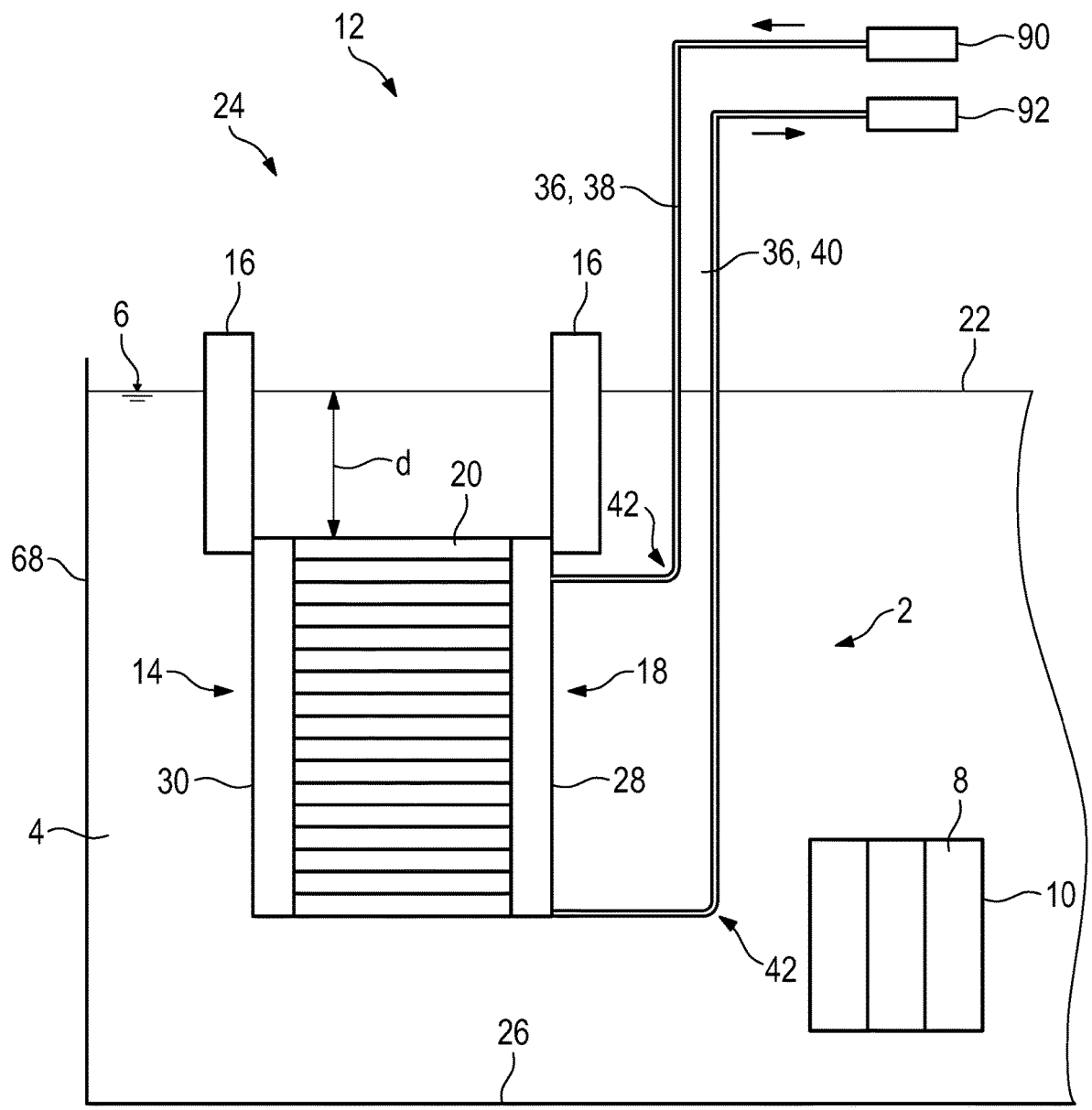
FIG. 7 is an illustration showing a variation of the embodiment shown in FIG. 1.

While in many cases a cooling circuit 32 with a circulating cooling agent is advantageous, there may be situations in which it is advantageous to have no closed circuit, but rather to guide a suitable low-temperature cooling agent like cool water from an internal or external source like a hydrant or from a large environmental reservoir like a river, lake, or ocean via the feed line 38 into heat exchanger 18, and to guide the heated cooling agent leaving the heat exchanger 18 via the discharge line 40 into a suitable reservoir or drainage system or back into the river, lake or ocean, preferably in some distance to sampling area. In this case, there is no need for the second heat exchanger 34 shown in FIG. 1. Such an alternative embodiment is shown in FIG. 7, wherein a source 90 and a drain 92 for the cooling agent (=secondary cooling fluid) are depicted in a purely schematic manner. In certain cases one might even eject the cooing agent leaving the heat exchanger 18 into the fuel pool 2. In such a case one only needs the feed line 38, but not necessarily the discharge line 40. Instead, a simple discharge opening at the heat exchanger 18 may be sufficient.

In a simple embodiment a flexible hose 44 drooping into the fuel pool 2 from a support above or from the pool's edge may be used. The hose 44 should be long enough to allow the heat exchanger 18 for sinking in its lowermost position when the filling level 6 inside the fuel pool 2 drops accordingly.

Figure 2:
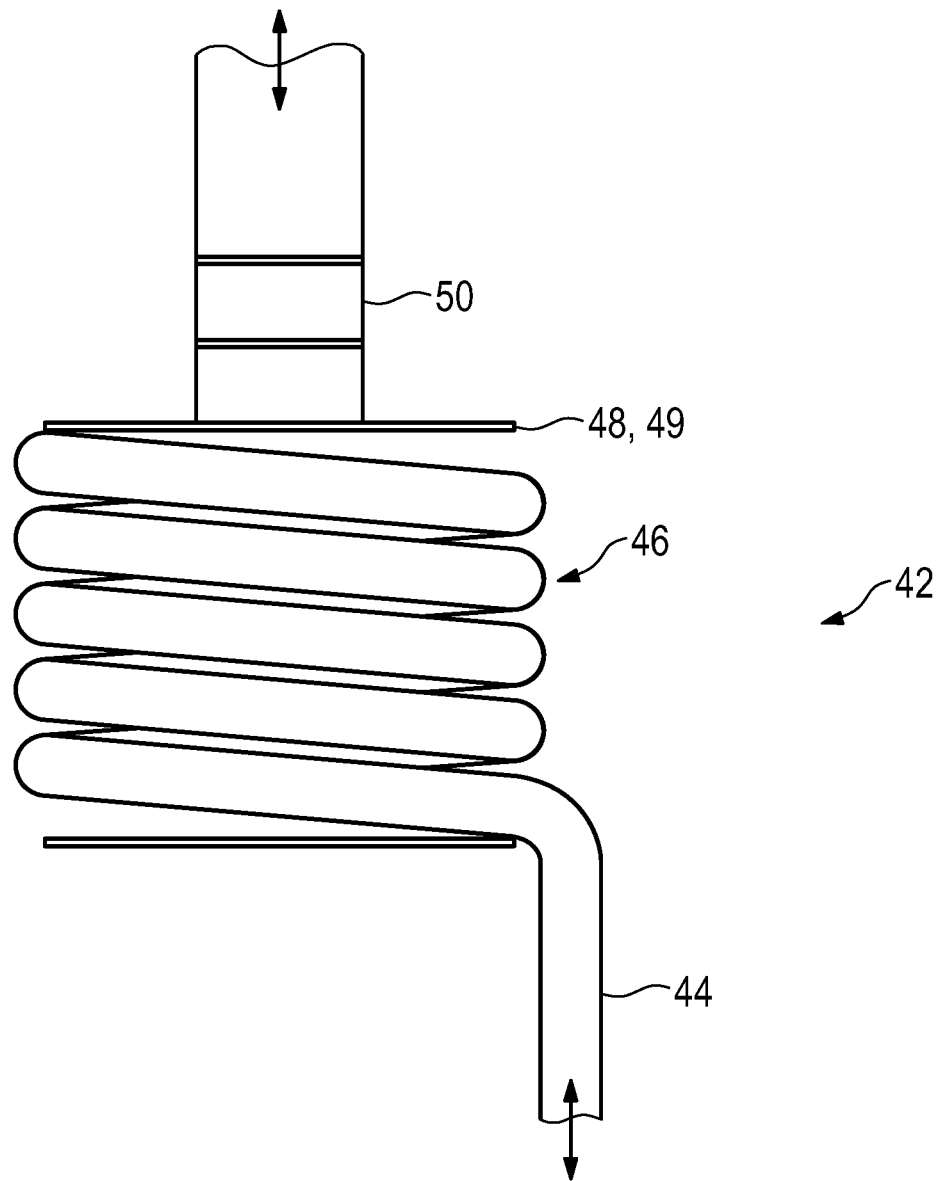
FIG. 2 is a diagrammatic, perspective view of a flexible line section of a connecting line for use in the cooling system according to FIG. 1 or FIG. 5.

In order to prevent (uncontrolled) dangling of the excess length or slack of the hose 44 when the filling level 6 inside the fuel pool 2 is rather high, a section of the hose 4 may comprise a number of spiral or helical windings 46, for example around a cylindrical support body 48 like a drum 49 as shown in FIG. 2. Just like a mechanical pull-spring the windings 46 expand in longitudinal or axial direction by virtue of a pulling force, and they elastically contract when the pulling force diminishes. Hence, the required length adjustment of the connecting line 36 is provided. Apart from that, a revolving tube coupling 50 may be used to connect the flexible hose section to a rigid tube section.

Figure 6:
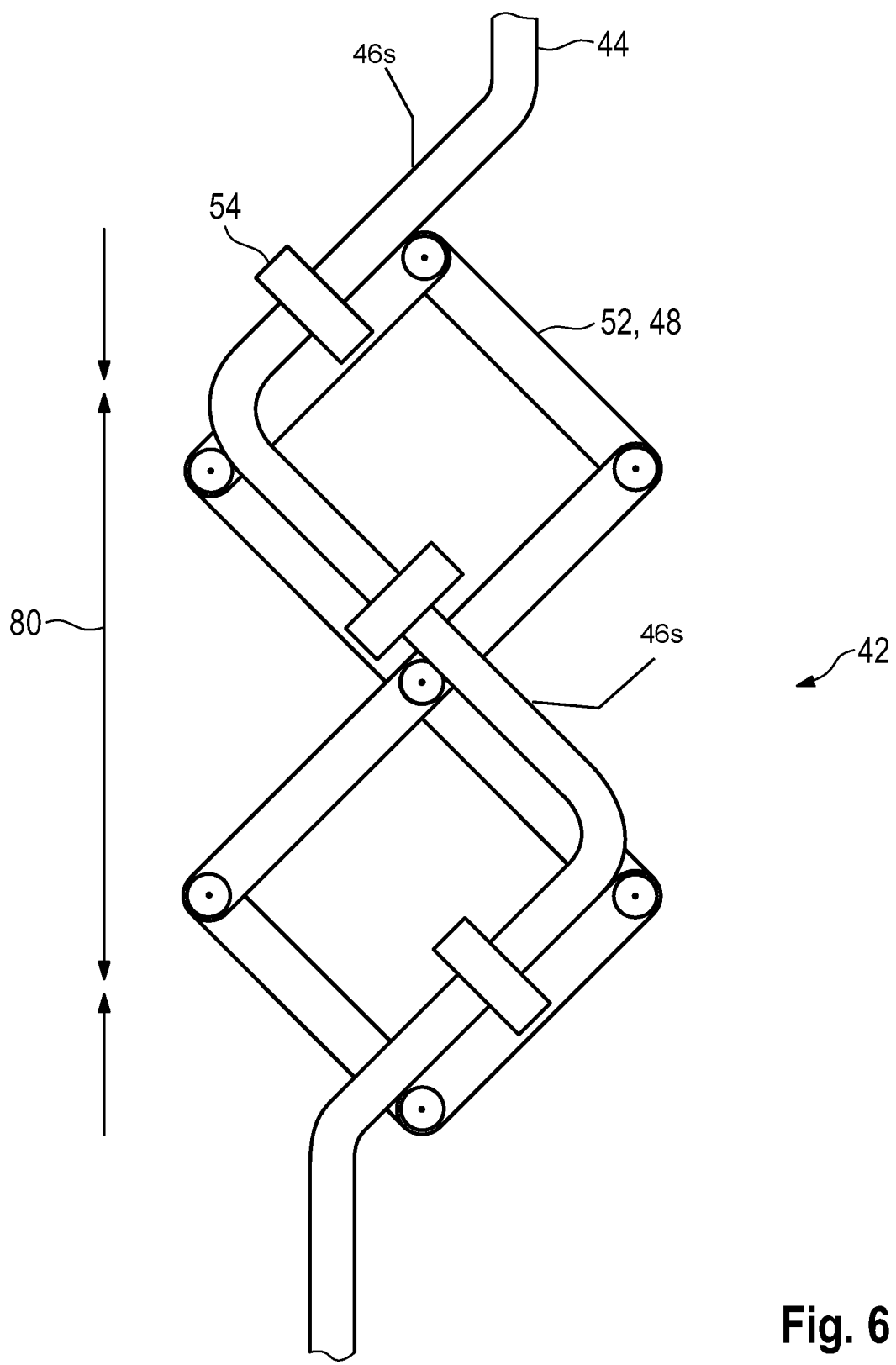
FIG. 6 is a perspective view of another flexible line section of a connecting line for use in the cooling system according to FIG. 1 or FIG. 5.

In an alternative embodiment according to FIG. 6 a flexible hose 44 is supported by a scissors arm 52 to which the hose 44 is attached by virtue of connecting pieces 54. Thus, the hose 44 comprises sinusoidal or meandering segments 46s on the associated support body 48, which can either be compressed or stretched along the longitudinal direction 80. Instead of a scissors arm 52 similar telescopic devices which provide for length adjustment in at least one direction can be used as support for the hose 44. In an alternative embodiment the hose 44 may comprise a number of windings 46 held together by number of connecting pieces or clamps with a predetermined breaking point, such that the connecting pieces break and the windings 46 unfold when the heat exchanger 18 drops down due to a decreasing filling level in the fuel pool 2.

It is advantageous to prevent lateral (horizontal) displacement of the cooling module 14 such that it cannot collide with the fuel elements 8 within the fuel pool 2 if the filling level 6 drops and such that it cannot float off the fuel pool 2 in the case of high filling level 6 (e.g. due to earthquake-induced waves). Besides that, certain areas of the fuel pool 2 must be kept accessible in order to provide for operating and emergency procedures.

Figure 4:
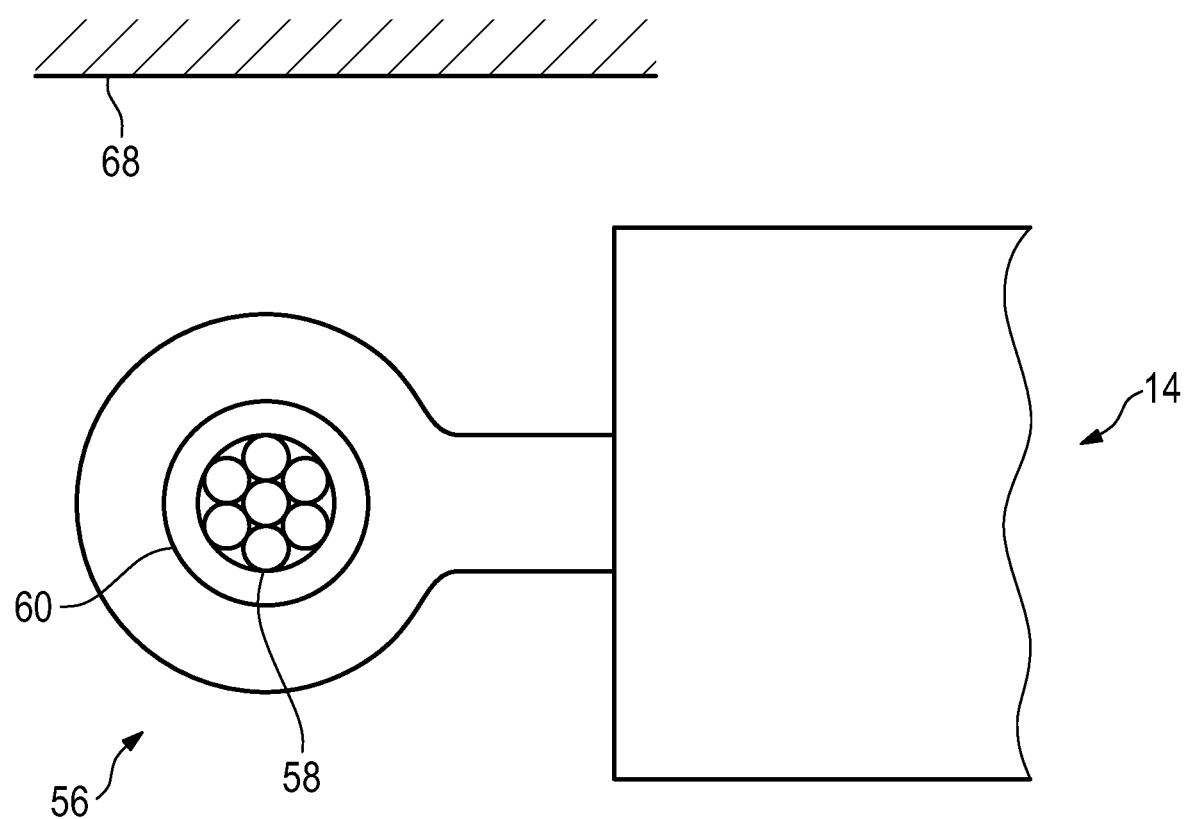
FIG. 4 is a top view of another guide device.

In one embodiment according to FIG. 4, shown in a top view from above the fuel pool 2, there is at least one lug 56 or eyelet fixed to the cooling module 14 and protruding laterally from it. The lug 56 encloses a vertically aligned rope, in particular a wire rope, or bar or rod or similar elongate guide element 58 with clearance such that a slide bearing 60 is established, allowing for movement along the vertical direction but essentially preventing lateral displacement (i.e. along any horizontal direction).

Figure 5:
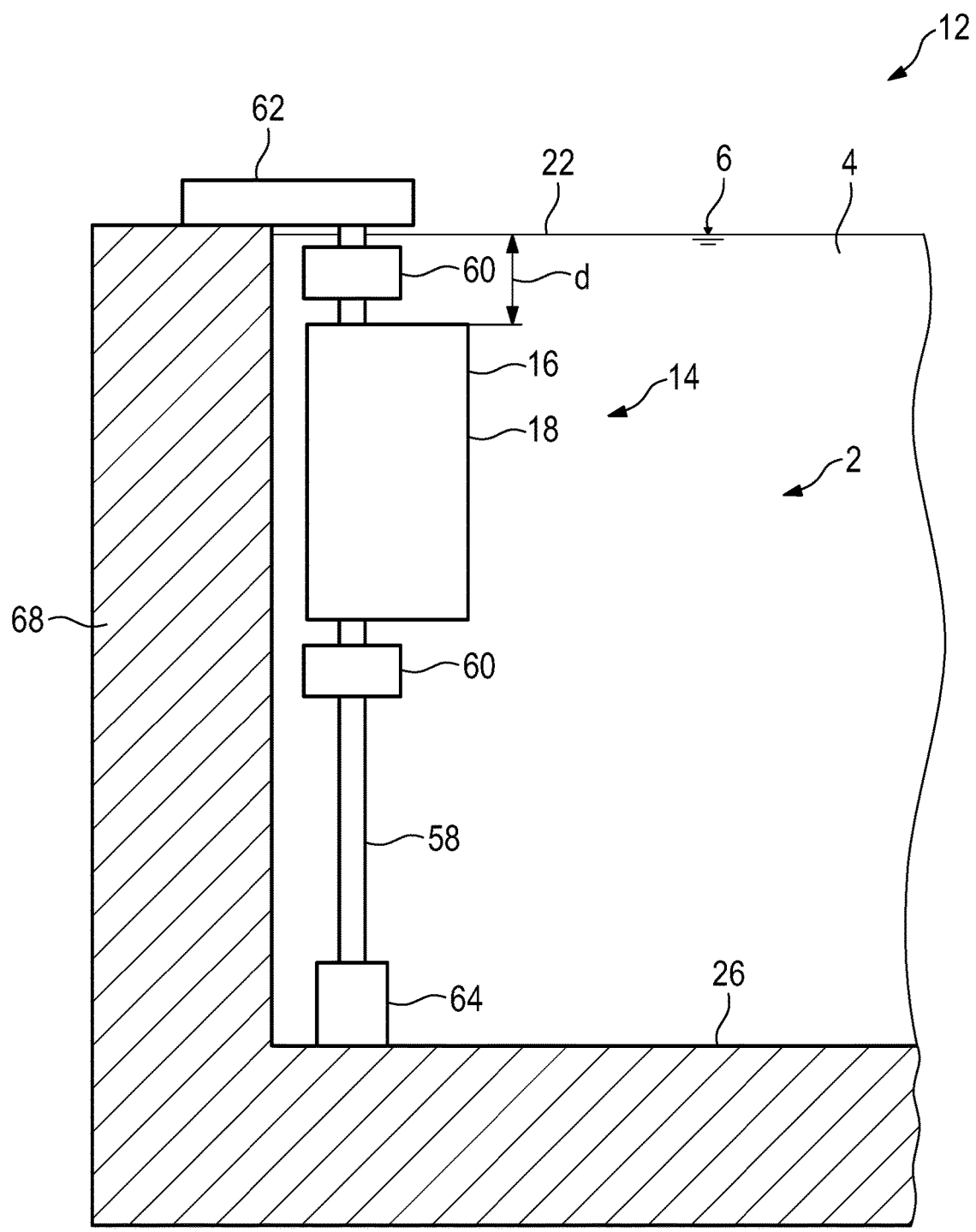
FIG. 5 is a side view of the other guide device for the cooling system for the nuclear fuel pool, the cooling system containing a floating heat exchanger and corresponding guide elements.

A similar solution is shown in a side view in FIG. 5, which also shows the mounting of the guide element 58. A top support 62 for the guide element 58 bears on the edge of the fuel pool's wall 68 and protrudes laterally above the surface 22 of the liquid 4 therein. A bottom support 64 for the guide element 58 bears on the ground 26 of the fuel pool 2. In case of a (flexible) rope, such rope is firmly clamped between the two supports. In case of a rigid bar or rod a single support may be sufficient. In general, instead of a bottom support 64 fixed to the ground 26 there may be a bottom weight simply resting on the ground 26 of the fuel pool 2 by gravity. Of course, these are just examples and there are many possible variations with respect to the supports.

In the embodiment according to FIG. 5 the lifting body 16 of the cooling module 14 is integrated with the heat exchanger 18 or arranged around it. For example, there may be several lifting chambers distributed over the body of the heat exchanger 18, altogether forming the lifting body 16. For example, at least some parts of the lifting body 16 may be arranged within a protective shell around a bundle of heat exchanger tubes 20. Hence, unlike the embodiment of FIG. 1 there is no lifting body 16 above the heat exchanger 18 floating on the surface 22 of the liquid 4 in the fuel pool 2.

Rather, the entire cooling module 14 floats within the liquid 4. However, the balance of buoyant versus weight forces is preferably such that there is a distance d between the upper end of the heat exchanger 18 (more precisely: the upper end of its heat transfer area) and the surface 22 of the liquid 4, just like in the embodiment of FIG. 1. This distance d is constant when the filling level 6 drops. One slide bearing 60 guided by the vertical guide element 58 is fixed to the cooling module 14 on its upper side; another slide bearing 60 is fixed to the cooling module 14 on its lower side. This does not only prevent lateral displacement but also tilting of the cooling module 14 from the upright position. Furthermore, the top support 62 for the guide element 58 acts as an upper end stop for the cooling module 14.

Figure 3:
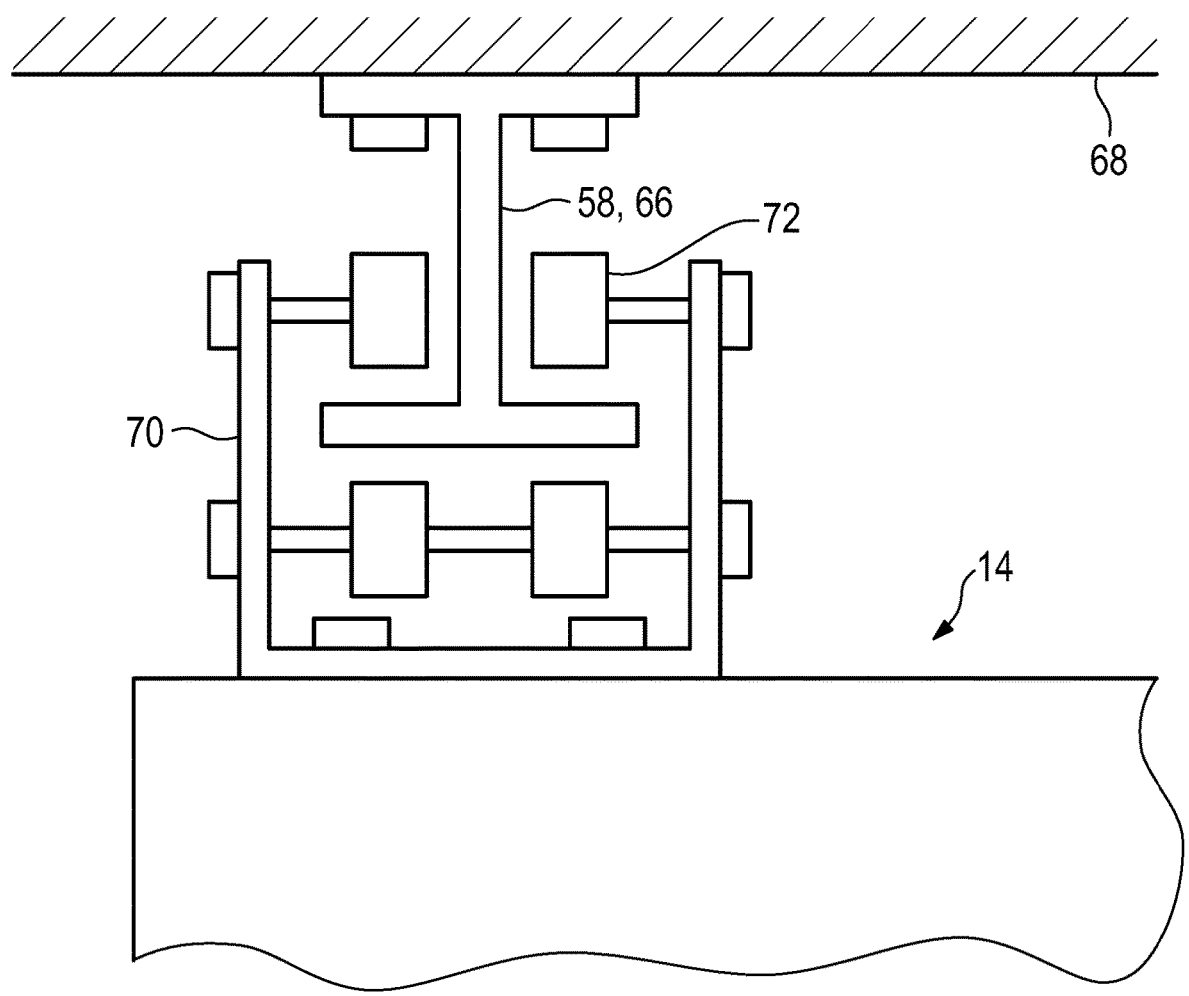
FIG. 3 is a top view of a guide device for the floating exchanger of FIG. 1 or FIG. 5.

FIG. 3 shows another embodiment of a guide system which allows for vertical movement of the cooling module 14 but prevents lateral displacement and preferably tilting too. It comprises a vertically aligned guide rail 66 which is fixed, for example, at the wall 68 of the fuel pool 2. In connection with a corresponding abutment 70 fixed to the cooling module 14 and having slide elements or skids or rolls 72 a slide bearing or roller bearing is established which provides for the above described functions. The guide rail 66 can be regarded as a special type of guide element 58.

Common to all the described guide systems is that they only have to take up (comparatively small) lateral forces. There is no vertical load transfer to any support. Thus, they are much easier to design, build, and mount than in the case of non-floating cooling modules.

In emergency situations the cooling module 14 may even be dropped or lowered manually or from a crane or from a helicopter into the fuel pool 2, such that it floats freely without any lateral support.

While the preceding description was focused on cooling systems for nuclear fuel pools, a cooling module according to the invention can be used in other technical areas as well to provide cooling for a pool or reservoir with varying liquid level therein. It can be used to provide for temporary or permanent cooling.

The following is a summary list of reference numerals and the corresponding structure used in the above description of the invention:
2 fuel pool
4 liquid
6 filling level
8 fuel element
10 fuel rack
12 nuclear facility
16 lifting body
18 heat exchanger
20 heat exchanger tube
22 surface
24 air
26 ground
28 distributor tube
30 collector tube
32 cooling circuit
34 heat exchanger
36 connecting line
38 feed line
40 discharge line
42 flexible line section
44 hose
46 winding
48 support body
50 tube coupling
52 scissors arm
54 connecting piece
56 lug
58 guide element
60 slide bearing
62 top support
64 bottom support
66 guide rail
68 wall
70 abutment
72 roll
80 longitudinal direction
90 source
92 drain
d distance

The invention claimed is:

1. A nuclear facility, comprising:
a fuel pool containing a liquid; and
a cooling system, containing:
   a cooling module with a heat exchanger which immerges into said liquid, said cooling module containing a lifting body floating in said liquid such that an altitude of said cooling module varies passively in accordance with a filling level of said liquid in said fuel pool;
   a source and a drain for a cooling agent which during operation of said cooling system flows through said heat exchanger;
   connecting lines connecting said heat exchanger to said source and to said drain; and
   at least one guide element preventing lateral displacement of said cooling module relative to said pool in any horizontal direction.

2. The nuclear facility according to claim 1, wherein said cooling module is configured such that in a floating state an uppermost part of said heat exchanger is situated below a surface of said liquid.

3. The nuclear facility according to claim 2, wherein:
said heat exchanger has a heat transfer area; and
a distance between an uppermost part of said heat transfer area and said surface of said liquid is in a range up to 5 m.

4. A nuclear facility, comprising:
a fuel pool containing a liquid; and
a cooling system, containing:
   a cooling module with a heat exchanger which immerges into said liquid, said cooling module containing a lifting body and floats in said liquid such that an altitude of said cooling module varies passively with a filling level of said liquid in said fuel pool;
   a source and a drain for a cooling agent which during operation of said cooling system flows through said heat exchanger;
   connecting lines connecting said heat exchanger to said source and to said drain; and
at least one guide element preventing lateral displacement of said cooling module.

5. The nuclear facility according to claim 1, wherein said at least one guide element prevents tilting of said cooling module.

6. The nuclear facility according to claim 1, wherein said at least one guide element contains a rope, a rod, or a bar.

7. The nuclear facility according to claim 1, wherein said lifting body is disposed above said heat exchanger.

8. The nuclear facility according to claim 1, wherein said lifting body is integrated with said heat exchanger.

9. The nuclear facility according to claim 1, wherein said cooling system is a passive cooling system based on a principle of natural convection.

10. The nuclear facility according to claim 1, wherein said cooling agent is water.

11. The nuclear facility according to claim 1, wherein said connecting lines each have a flexible line section for adapting to a varying altitude of said cooling module.

12. The nuclear facility according to claim 11, wherein said flexible line section has a hose with a plurality of meandering segments on a support body.

13. The nuclear facility according to claim 12, wherein said support body is a scissors arm.

14. The nuclear facility according to claim 1, wherein said cooling module includes a protective shell, said heat exchanger contains a plurality of heat exchanger pipes which altogether are enclosed by said protective shell, and wherein there is a gap between said protective shell and said heat exchanger pipes into which said liquid can flow.

* * * * *